J. A. GOGEL.
Cultivator.

No. 227,687. Patented May 18, 1880.

Witnesses:
D. F. Howl
Levi Bacon

Inventor:
John A. Gogel
By W. Morris Smith
Attorney.

UNITED STATES PATENT OFFICE.

JOHN A. GOGEL, OF TOLEDO, OHIO.

CULTIVATOR.

SPECIFICATION forming part of Letters Patent No. 227,687, dated May 18, 1880.

Application filed February 27, 1880.

*To all whom it may concern:*

Be it known that I, JOHN A. GOGEL, of Toledo, in Lucas county and State of Ohio, have invented an Improved Cultivator, of which the following is a specification.

This invention consists in certain improvements in combination with the standards and clamping devices, whereby a more varied adjustment of the shovels is obtained.

Figure 1:
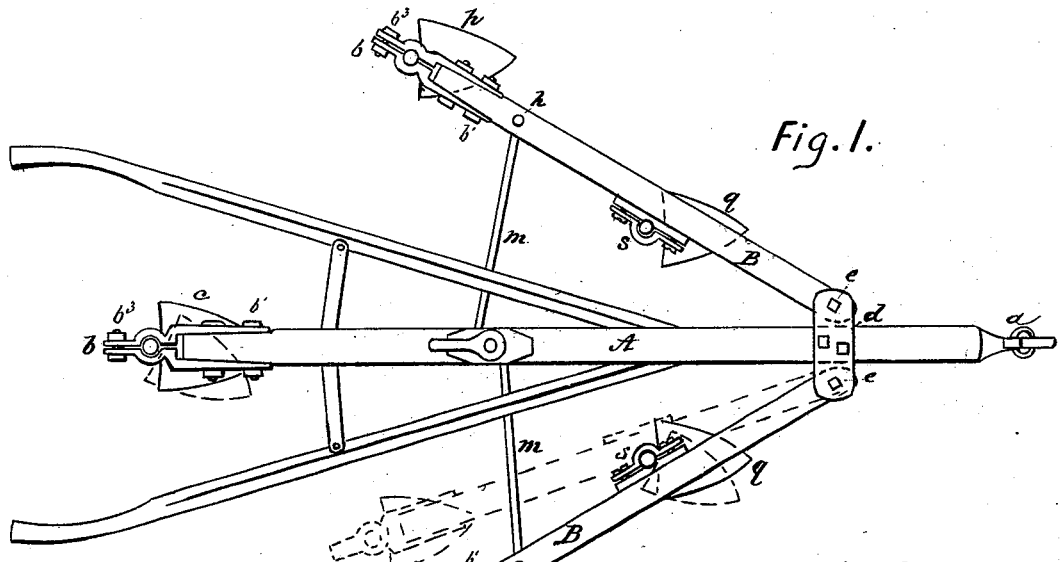
Figure 3:
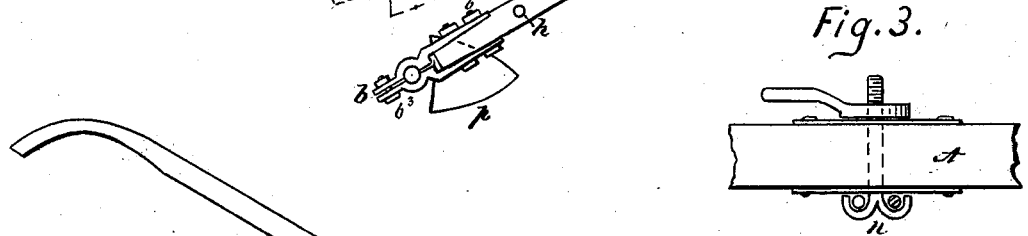
Figure 2:
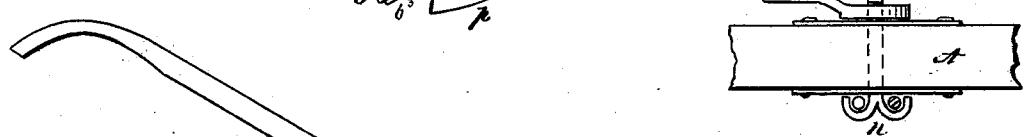

In the accompanying drawings, Figure 1 represents a plan of a cultivator embracing my improvements. Fig. 2 is a side view of the same; and Fig. 3, a section of the main beam, showing the locking-bolt for regulating the width of the machine.

The same letters occurring on the several figures indicate like parts.

This machine consists of a main central beam, A, provided with the usual clevis $a$ at its forward end and a clamping device, $b$, at its rear end for holding the shovel $c$ in an adjustable manner.

A short distance in rear of the clevis two iron plates, $d$, are firmly secured to the beam A, one above and the other below it, and in a transverse position, between which the side beams, B, are pivoted by bolts $e$ passing vertically through them. Near the rear end of these side beams are connected, in a pivotal manner, at $h$, the rods $m$, which pass under the main beam, and are secured thereto by tightening the double hook-headed bolt $n$, as shown more clearly in Fig. 3, by which means the side beams may be set farther apart or nearer to the main beam as desired to suit the breadth of furrow to be cultivated.

Shovels $p$ are also connected at the rear end of each of the side beams by a similar device to that at the end of the main beam, and others, $q$, by a side clamp, $s$, at about mid-length of the side beams. These shovels are each constructed with a straight round stem or shank, $f$, which passes vertically through the clamping devices $b$ $s$, attached to the several beams, by which means they may be turned to the right or left, or they may be raised or lowered, as desired, and clamped in position to skim the surface or plow deep, or to turn the earth to either side, at pleasure, by tightening the binding-screws of said clamps.

The clamping devices $b$ are furthermore constructed with slots $b^2$, through which the rear bolts pass, so that by loosening said bolts and using the forward one, $b'$, as a pivot, said clamps may be tilted upward or downward and clamped in either position to vary the vertical angle of the shovels.

Having thus described my invention, what I claim as new, and desire to secure by Letters Patent, is—

The clamping-plates $b$, composed of two half-sections embracing the rear end of the beam, having the pivot-bolt $b'$ and the curved vertical slots $b^2$, in combination with the round standards $f$ and clamping-bolts $b^3$, substantially as shown and described.

JOHN ADAM GOGEL.

Witnesses:
 CHRISTIAN BRAUNSCHWEIGER,
 SAMUEL D. DARE.